United States Patent [19]

Suzuki et al.

[11] Patent Number: 4,496,810
[45] Date of Patent: Jan. 29, 1985

[54] COLUMN MOUNTED SWITCHING DEVICE FOR AUTOMOBILES

[75] Inventors: Masaru Suzuki, Aichi; Masayosi Iwata; Yoshikazu Hayashi, both of Gifu; Tadashi Yokoyama, Mie, all of Japan

[73] Assignee: Kabushiki Kaisha Tokai-Rika-Denki-Seisakusho, Aichi, Japan

[21] Appl. No.: 481,787

[22] Filed: Apr. 4, 1983

[30] Foreign Application Priority Data

Apr. 7, 1982 [JP] Japan .............................. 57-51019[U]

[51] Int. Cl.³ ............................................. H01H 9/00
[52] U.S. Cl. .................................. 200/61.54; 200/61.3
[58] Field of Search ............... 200/61.27, 61.28, 61.29, 200/61.3, 61.31, 61.32, 61.33, 61.34, 61.35, 61.36, 61.37, 61.38, 153 J, 61.54; 340/67, 81 R, 81 F

[56] References Cited

U.S. PATENT DOCUMENTS

| | | | |
|---|---|---|---|
| 3,510,839 | 5/1970 | Elliott et al. | 340/67 X |
| 3,662,336 | 5/1972 | Suzuki et al. | 340/81 F |
| 3,944,765 | 3/1976 | Kawai et al. | 200/61.27 |
| 4,351,991 | 9/1982 | Morita et al. | 200/61.3 |

FOREIGN PATENT DOCUMENTS 197808 8/1978 France .......................... 200/153 JH Primary Examiner—A. D. Pellinen
Assistant Examiner—Morris Ginsburg
Attorney, Agent, or Firm—Koda and Androlia

[57] ABSTRACT

Operation members for a turn-signal switch signalling a change of an advance course of an automobile and operation members for a hazard switch signalling an emergency situation of the automobile are arranged close to one another on the same plane, the former is of a knob type swingingly operated and the latter is of a push button type repeatedly operated. Both the switches possess in common an insulator.

Accordingly, both the switches are able to be arranged reasonably on a steering column and improved in operationability. In addition, connection among contacts fixed to the insulator is able to be simplified.

16 Claims, 5 Drawing Figures

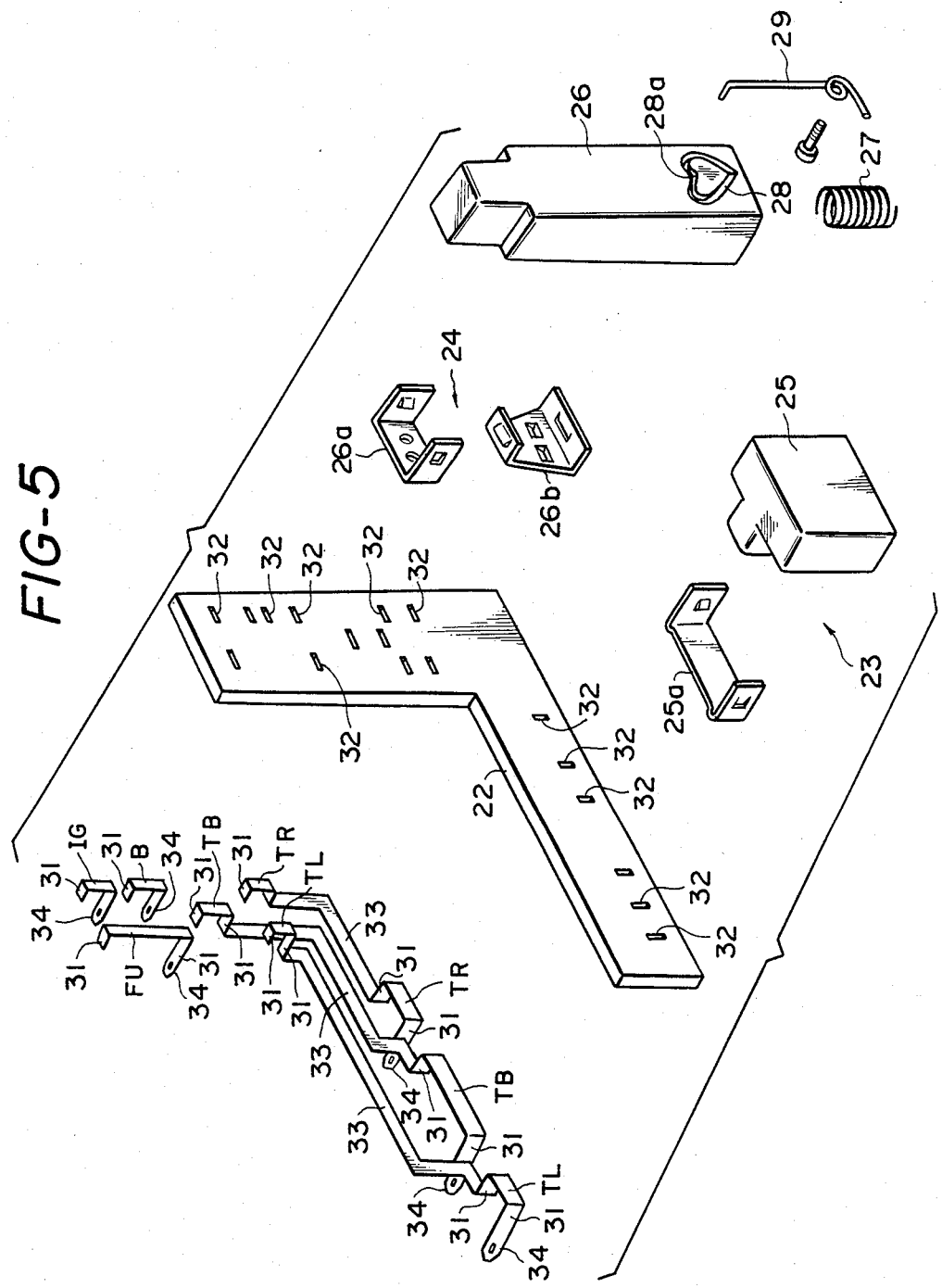

COLUMN MOUNTED SWITCHING DEVICE FOR AUTOMOBILES

BACKGROUND OF THE INVENTION

1. Field of the Invention

This invention relates to a column mounted switching device for automobiles in which a turn-signal switch, a hazard switch and the like are coaxially mounted on a steering column.

2. Description of the Prior Art

A turn-signal lamp signalling the change of the advance course of an automobile and a hazard lamp signalling an emergency situation of the automobile are actuated by the operation of the respective turn-signal switch and hazard switch provided near to a steering column. The operation member for turn-signal switch and that for hazard switch are arranged usually on the steering column separately to one another in the prior structure. Also, as the former is used a lengthened lever of a swing operation type but as the latter is used a knob of a push-pull type. Therefore, both the switches relative to one another are inferior in operationability.

In addition, it has been proposed in recent years that the operation member for turn-signal switch is arranged on a position relatively separated from a steering shaft whereby it is made easy to operate the operation member under the condition that the steering wheel is grasped by a driver. In this case, if the lever is made long, the operation stroke thereof also becomes long of necessity so that the operationability of the lever is lowered.

Furthermore, in order to settle the above problem U.S Pat. No. 4,351,991 has proposed such a structure that a self-cancelling mechanism for a turn-signal switch is separated from the operation member therefor and both are connected with a connecting member. In the art disclosed in this Patent the whole structure fails in utility with respect to the arrangement on the steering column, and the hazard switch is not taken into consideration at all. The art is, thus, inferior in the whole design and the operationability of the switches.

SUMMARY OF THE INVENTION

The present invention has been developed to overcome the above-described disadvantages.

An object of the present invention is to provide a column mounted switching device for automobiles, in which operation members for a turn-signal switch and that for a hazard switch are arranged close to one another on the same plane, the former is of a knob type swingingly operated and therewith the latter is of a push button type repeatedly push-operated to thereby enhance a design property about a steering column and an operationability of both the switches whereby the whole arrangement is made reasonable.

Another object of the present invention is to provide a column mounted switching device for automobiles, in which the turn-signal switch and the hazard switch are provided on an insulator in common to thereby simplify connections among contacts fixed to the insulator.

Description will hereinunder be given of an embodiment of the present invention with reference to the attached drawings.

BRIEF DESCRIPTION OF THE DRAWINGS

The drawings show an embodiment of the present invention.

FIG. 5 is a disassembled perspective view showing an assembly between an insulator and contacts.

DESCRIPTION OF THE PREFERRED EMBODIMENT

Figure 1:
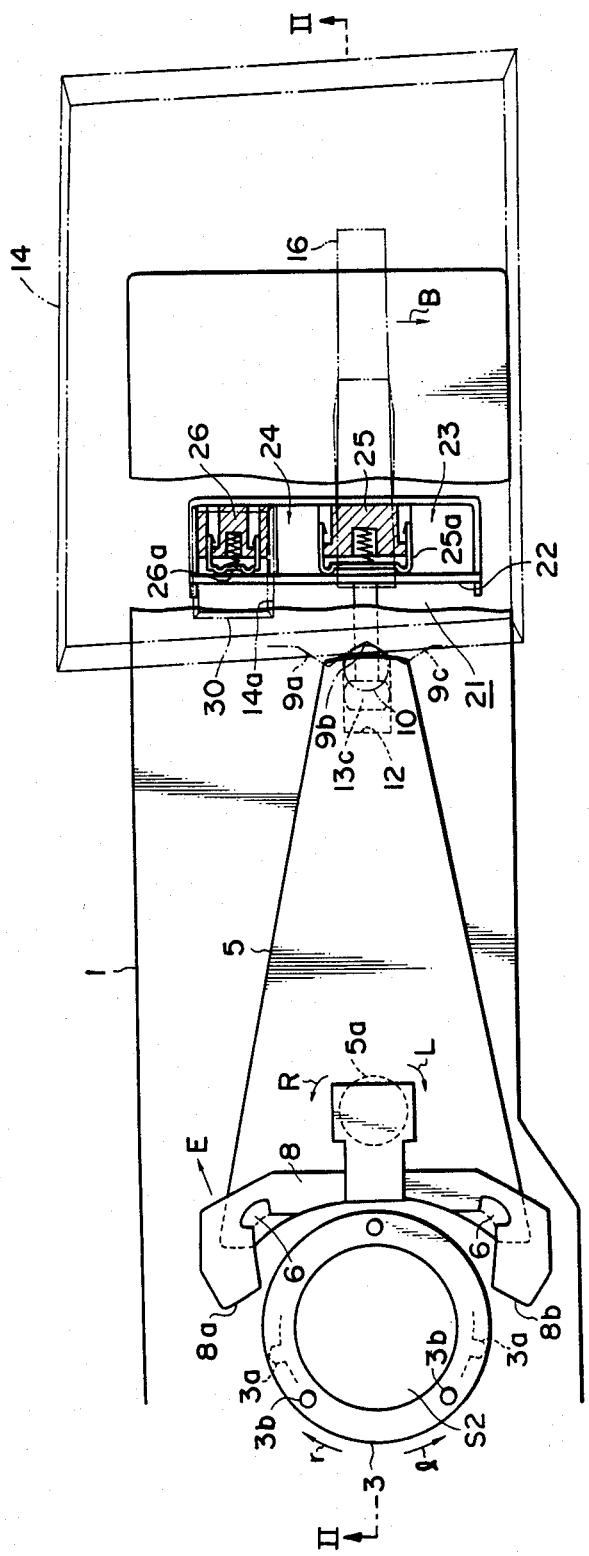
FIG. 1 is a partially sectional front view showing an embodiment of the column mounted switching device for automobiles according to the present invention.
Figure 2:
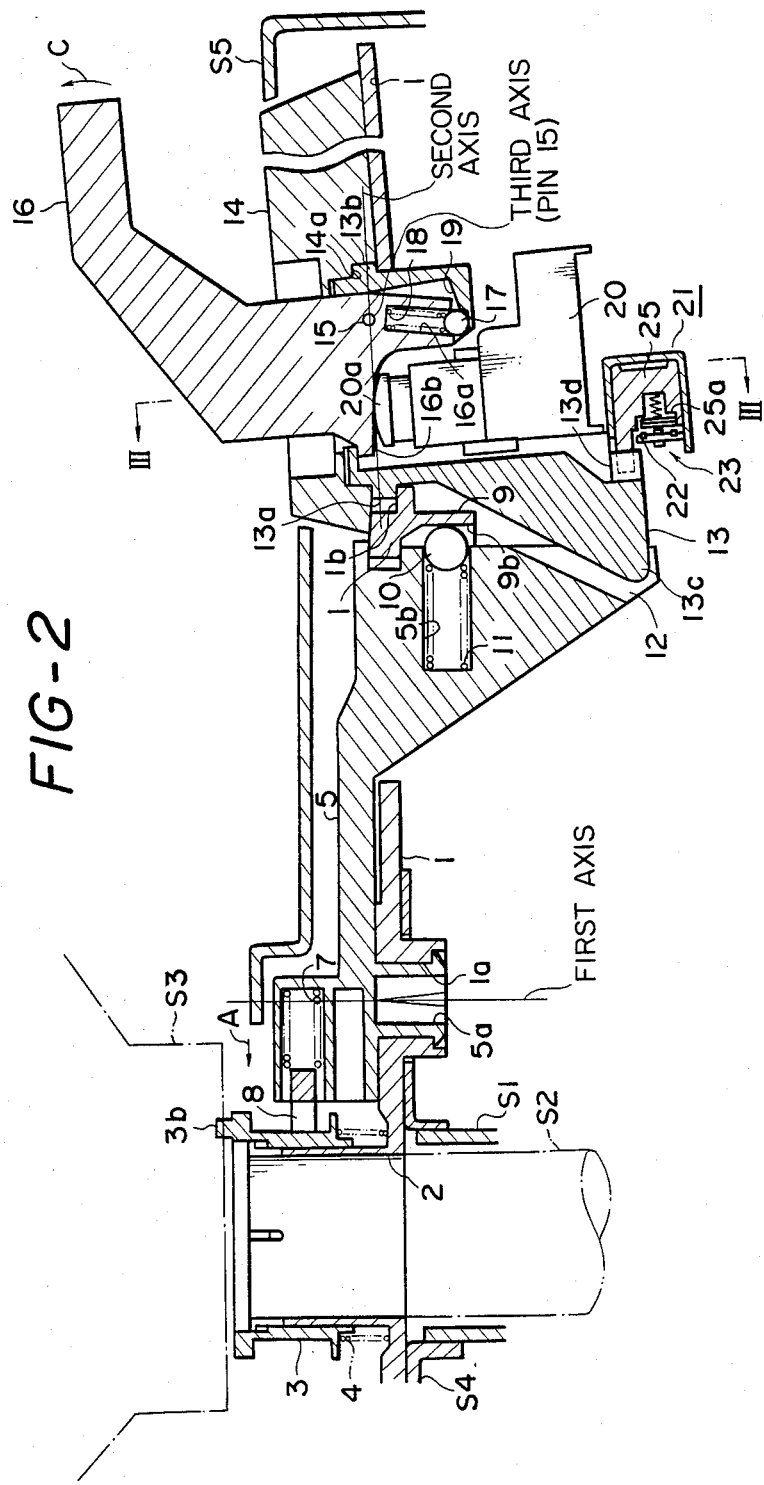
FIG. 2 is a cross-sectional view taken along the line II—II in FIG. 1.

As shown in FIGS. 1 and 2, a steering column is provided with a column tube S1 to which a steering shaft S2 is rotatably supported at a center of the axis portion thereof and a column cover S5 surrounding a turn-signal switch, a hazard switch and the like, and fixed to the end portion of the steering shaft S2 is a steering wheel S3 offered for operation by a driver.

A switch mounting base plate 1 is fixed to the column tube S1 through a steel plate S4 by such a fastening means as a screw. The end portion of the cylindrical portion 2 of the base plate 1 is rotatably inserted into a cylindrical cancelling cam body 3 whereby the cylindrical cancelling cam body 3 is made rotatable about the cylindrical portion 2. Three projections 3b projected from the cancelling cam body 3 in the direction of the axis thereof are arranged at the position where the projections 3b are engaged with an engaging hole formed in the steering wheel S3 by the spring force of a compression coil spring 4 at the time when the steering wheel S3 is rotated, whereby the cancelling cam body 3 is rotated together with the steering wheel S3. In addition, a pair of cancelling cams 3a are projected from the outer periphery of the cancelling cam body 3.

A turn bracket 5 is rotatably supported at the cylindrical portion 5a thereof to a through-hole 1a formed in the switch mounting baseplate 1. The turn bracket 5 is provided with two projections 6 and 6 in the form of surrounding the cancelling cam body 3 and the projections 6,6 are abutted to a ratchet 8, as being a bracket-returning member, forced in the direction of arrow mark A by a coil spring 7. The ratchet 8 is planely slidable along the bracket 5 and provided at both end portions thereof with projections 8a and 8b directing towards the cancelling cam body 3. The switch mounting base plate 1 is integrally therewith provided with a detent wall 9 opposing to the end portion of the bracket 5 and three cam recesses 9a to 9c are linearly formed in the detent wall 9. Also, the end portion of the bracket 5 is provided with a blind hole 5b to which a ball 10, engaging with the cam recesses 9a through 9c, and a coil spring 11, forcing the ball 10 in the direction of the cam recesses 9a to 9c, are inserted.

Accordingly, the turn bracket 5 is able to be revolved in the center of the cylindrical body 5a from the position shown in FIG. 1 where the ball 10 is abutted to the cam recess 9b to the position corresponding to the cam recess 9a or 9c in the direction of arrow mark R or L shown in FIG. 1.

The turn bracket 5 is also formed in the end portion thereof with a connecting recess 12. A knob 16 is rotatably supported through a pin 15 to a knob holder 13 which is rotatably supported at axis portions 13a and 13b thereof to recesses 1b and 14a respectively formed in the switch mounting base plate 1 and a trim panel 14. The knob 16 is projected from the trim panel 14 facing to the opening of the column cover S5. Also, a connecting projection 13c of the lower part in the knob holder 13 is engaged with the connecting recess 12 stated above.

As a result, the turn bracket 5 can be revolved through the connecting projection 13c and the connecting recess 12 in the direction of the arrow mark R or L shown in FIG. 1 by rotating the knob holder 13 in the center of the axis portions 13a and 13b, for which the knob 16 may be revolved in the direction of the arrow mark B shown in FIG. 1 or in the direction reverse thereto.

The knob 16 is formed with a blind hole 16a in which a ball 17 and a coil spring 18 are inserted, and the ball 17 is elastically abutted to a guide surface 19 formed on the knob holder 13. The switch mounting base plate 1 is fixed with a dimmer and passing switch 20 and an operation button 20a thereof is abutted to an operation portion 16b of the knob 16.

Accordingly, the operation button 20a is pushed in when the knob 16 is revolved about the pin 15 in the direction of the arrow mark C shown in FIG. 2. The dimmer and passing switch 20 can be switched over between the upward condition of head lamps and the downward condition thereof each time the operation button 20a is pushed in, and the passing action, i.e. the head lamps are lighted only in the time of the pushing-in of the operation button 20a, can be carried out by the pushing-in operation of the operation button 20a at the time when the head lamp switch is off.

On the other hand, a complex switch 21 is fixed to the switch mounting base plate 1 and is provided with a turn-signal switch 23 and a hazard switch 24 possessing in common an L-shaped insulator 22 as shown in FIG. 5. The complex switch 21 is provided with a switch case 21a in which a contact holder 25 for the turn-signal switch 23 is connected to a connecting portion 13d formed in the lower end of the knob holder 13 and is provided with a movable contact 25a. A contact holder 26 for the hazard switch 24 is provided with two movable contacts 26a and 26b, and the contact holder 26 is always forced upwardly by a coil spring 27. The cohtact holder 26 is also provided with a heart-shaped cam recess 28 where a hook portion formed in one end of a linear spring 29 is inserted and latched, the other end of which is fixed to the switch case 21a. Positioned close to the knob 16 is a push button 30 slidably mounted to a through-hole 14a formed in the trim panel 14 and the bottom end of the push button 30 is abutted to the top end of the contact holder 26. In addition, the insulator 22 is provided with fixed contacts IG, B, FU, TB, TB, TR, TR, TL and TL by selectively opposing to the movable contacts 25a, 26a and 26b.

As shown in FIG. 5, the fixed contacts IG, B, FU, TB, TB, TR, TR, TL and TL are formed with the respective bent portions 31 bent in both the longitudinal end portions thereof at a right angle and are fixed to the insulator 22 by inserting the bent portions 31 into slits 32 formed in the insulator 22. The fixation of these contacts can be reinforced by further bending the tip ends of the bent portions 31 at a right angle in the reverse side of the insulator 22, if necessary.

In addition, the respective two contacts TB, TR and TL are electrically connected to one another through connecting pieces 33 provided on one ends thereof. Furthermore, the other ends of the contacts TB, TR and TL and those of the contacts FU, B and IG are projected to the reverse side of the insulator 22 so as to form connecting terminals 34 which are utilized for connection with connectors, not shown. Also, the bent portions 31 of the respective contacts IG, B, FU, TB, TB, TR, TR, TL and TL may be formed when they are mounted to the insulator 22.

Figure 4:
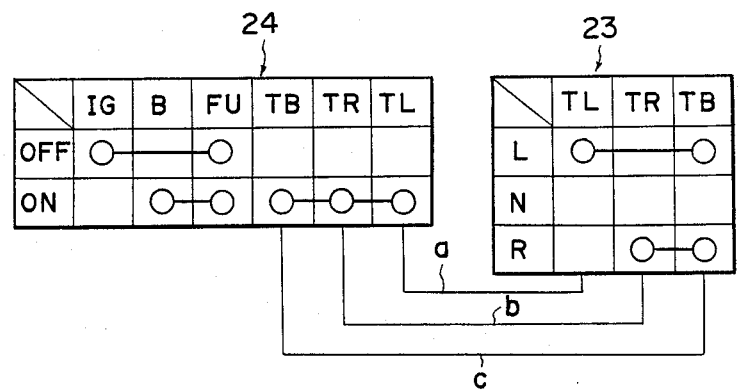
FIG. 4 is a table showing the relationship of connection among respective switches.

As shown in FIG. 4, the fixed contact IG is connected to a battery through an ignition switch, the fixed contact B is connected directly to the battery, a flasher unit is connected between the fixed contacrs FU and TB and a flasher lamp is connected to each of the fixed contacts TR and TL.

Description will now be given of operation thereof.

Figure 3:
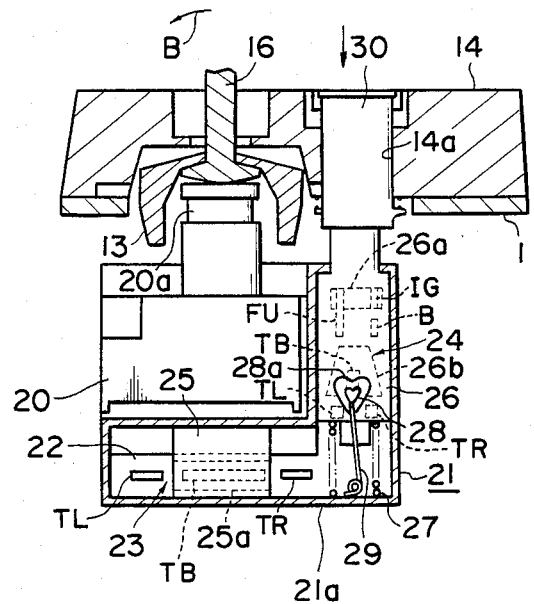
FIG. 3 is a sectional view taken along the line III—III in FIG. 2.

As shown in FIGS. 1 through 3, when the knob 16 is put in a neutral position and when the top face of the push button 30 and the upper surface of the trim panel 14 form the same plane, the turn-signal switch 23 is positioned in the situation N shown in FIG. 4 and the hazard switch 24 is positioned in the situation OFF shown in FIG. 4. At this time the projections 8a and 8b of the ratchet 8 are positioned out of the rotation locus described by the rotation of the cancelling cams 3a of the cancelling cam body 3 and the ball 10 is engaged with the cam recess 9b, the other end of the linear spring 29 being engaged with the bottom portion of the heart-shaped cam recess 28.

Next, when the knob 16 is operated in the direction of the arrow mark B shown in FIG. 3, centering the axis portions 13a and 13b of the knob holder 13, the knob holder 13 is rotated in the same direction as the knob 16 whereby the contact holder 25 is slided and the turn-signal switch 23 is positioned in the situation R shown in FIG. 4. In addition thereto, the turn bracket 5 is also revolved in the direction of the arrow mark R according to the rotation of the knob holder 13 so that the projection 8a of the ratchet 8 is moved within the rotation locus of the cancelling cams 3a and the ball 10 is engaged with the cam recess 9a. Under the above-stated conditions, even if the steering wheel S3 is rotated in the direction of the arrow mark r, the ratchet 8 is slided in the direction of the arrow mark E so that the projection 8a of the ratchet 8 moves over the tip end of the cancelling cam 3a during the time when the projection 8a contacts with the cancelling cam 3a whereby the turn bracket 5 is not returned back to the neutral position shown in FIGS. 1 and 3. However, when the steering wheel S3 is rotated in the direction of the arrow mark l to cause the cancelling cam 3a to abut on the projection 8a of the ratchet 8, the turn bracket 5 is revolved in the direction of the arrow mark L to be returned back to the neutral position shown in FIGS. 1 and 3 whereby the knob holder 13 and the contact holder 25 are also returned back to the neutral positions, respectively. Thus, the action of the self-cancelling mechanism is carried out.

On the other hand, when the knob 16 in the neutral position is operated in the direction reverse to the arrow mark B, centering the axis portions 13a and 13b of the knob holder 13, the knob holder 13 is rotated in the same direction as the knob 16 to slide the contact holder 25 so that the turn-signal switch 23 is moved to the situation L shown in FIG. 4. In addition, the turn bracket 5 is also rotated in the direction of the arrow mark L according to the above rotation of the knob holder 13 to cause the projection 8b of the ratchet 8 to move within the rotation locus of the cancelling cam 3a and the ball 10 is engaged with the cam recess 9c. Accordingly, the self-cancelling is carried out when the steering wheel S3 is rotated in the direction of the arrow mark r in the same manner as described above.

Furthermore, when the knob 16 is revolved in the direction of the arrow mark C centering the pin 15, the operation button 20a of the dimmer and passing switch 20 is pushed in to effect the dimmer or passing action, and when the knob 16 is released, the operation button 20a is automatically returned back to the neutral position by the co-operation of the ball 17, the coil spring 18 and the guide surface 19.

On the other hand, when the push button 30 is subjected to the pushing-in operation, the contact holder 26 is moved downwardly to cause the other end of the linear spring 29 to engage with the recess 28a of the top portion of the cam recess 28 so that the contact holder 26 is maintained in the lower position against the coil spring 27 and the hazard switch 24 is positioned in the situation ON shown in FIG. 4. In addition, when the push button 30 is subjected to the pushing-in operation again, the engagement of the linear spring 29 with the recess 28a is released so that the contact holder 26 is returned back to the beginning position shown in FIG. 3 by the elastic force of the coil spring 27, i.e. the hazard switch 24 is moved back to the situation OFF shown in FIG. 4.

In the present embodiment the turn-signal switch 23 and the hazard switch 24 possess the one insulator 22 in common and, therefore, the respective inner connections shown by lines a, b and c in FIG. 4, for example the connecting pieces 34, can be formed of metal sheet integrally with the fixed contacts, and the male connecting terminals 34 can also be formed integrally with the fixed contacts. Thus, such a work as soldering for wiring can be omitted whereby the workability and the productivity can be improved according to the present embodiment.

As has been clarified hereinabove, the present invention can provide the column mounted switching device for automobiles, having an excellent operationability and an enhanced design property since the operation member for the turn-signal switch and that for the hazard switch are arranged close to one another on the same plane, the former is of a knob type swingingly operated and the latter is of a push button type repeatedly push-operated.

What is claimed is:

1. A column mounted switching device for automobiles mounted on a steering column, comprising:
   (a) a base plate mounted on the steering column;
   (b) a turn bracket pivotally supported on the base plate about a first axis parallel to the axis of the steering column;
   (c) operating means rotatably supported on the base plate about a second axis substantially to a right angle to the first axis, said operating means having a first portion projected from a surface of the turn bracket upwardly and a second portion connected to a portion of the turn bracket, whereby when the operating means rotates about the second axis, the turn bracket being able to pivot about the first axis through the portion of the turn bracket;
   (d) a turn-signal switch operated by the rotation of the operating means about the second axis;
   (e) a self-cancelling mechanism disposed between the turn bracket and a steering shaft and returning the turn bracket and the operating means back to a neutral position at the time of the rotation of a steering wheel;
   (f) a push buttom arranged close to the first portion of the operating means and on the same plane of the first portion; and
   (g) a hazard switch switched on or off by the repeated push operation of the push button.

2. A column mounted switching device for automobiles as set forth in claim 1, wherein the operating means comprises:
   a knob holder rotatably supported on the base plate about the second axis and including the second portion connected to the portion of the turn bracket; and
   an operation knob pivotally supported on the knob holder about a third axis directed substantially to a right angle to the second axis and including the first portion projected from the surface of the turn bracket upwardly;
   said operation knob and the knob holder being rotatable about the second axis together, said base plate further being provided with a dimmer and passing switch operated when the operation knob is rotated about the third axis.

3. A column mounted switching device for automobiles as set forth in claim 2, wherein the base plate is provided with the dimmer and passing switch in parallel with the hazard switch, worked when the operation knob is rotated to the knob holder.

4. A column mounted switching device for automobiles as set forth in claim 2, further comprising;
   (i) an insulator for mounting contacts, possessed in common by the turn-signal switch and the hazard switch;
   (j) turn-signal contacts mounted on the insulator;
   (k) a turn-signal movable contact opposing to the turn-signal contacts and selectively contacting with the turn-signal contacts according to turn-signal operation by an occupant;
   (l) hazard contacts mounted on the insulator; and
   (m) a hazard movable contact opposing to the hazard contacts and selectively contacting with the hazard contacts according to hazard operation by the occupant.

5. A column mounted switching device for automobiles as set forth in claim 1, further comprising;
   (i) an insulator for mounting contacts, possessed in common by the turn-signal switch and the hazard switch;
   (j) turn-signal contacts mounted on the insulator;
   (k) a turn-signal movable contact opposing to the turn-signal contacts and selectively contacting with the turn-signal contacts according to turn-signal operation by an occupant;
   (l) hazard contacts mounted on the insulator; and
   (m) a hazard movable contact opposing to the hazard contacts and selectively contacting with the hazard contacts according to hazard operation by the occupant.

6. A column mounted switching device for automobiles as set forth in claim 5, wherein the turn-signal contacts comprises a turn-signal first contact, a turn-signal contact for right lamp for connection to the turn-signal first contact and switching on and off a turn-signal right side lamp of the automobiles and a turn-signal contact for left lamp for connection to the turn-signal first contact and switching on and off a turn-signal left side lamp of the automobiles; the hazard contacts comprises a hazard first contact, a hazard contact for right lamp and a hazard contact for left lamp in the same manner as the turn-signal contacts; and a group of the turn-signal first contact and the hazard first contact, a group of the turn-signal contact for right lamp and the hazard contact for right lamp and a group of the turn-signal contact for left lamp and the hazard contact for left lamp are respectively formed of contact pieces integrally connected to one another.

7. A column mounted switching device for automobiles as set forth in claim 6, wherein each of the contact pieces is provided on at least one end thereof with a male connector terminal for connecting with such a power source as an automobile battery, the male connector terminal being formed integrally with each of the contact pieces.

8. A column mounted switching device for automobiles as set forth in claim 7, wherein the moving direction of the turn-signal movable contact and that of the hazard movable contact are substantially of a right angle to one another and corresponding to the moving directions thereof each of the contact pieces is arranged on the insulator whereby the insulator is formed almost in an L shape.

9. A column mounted switching device for automobiles as set forth in claim 1, wherein the hazard switch is provided with a holder suporting a hazard movable contact, the holder is formed with a heart-shaped cam and is forced in a reverse direction to an operation direction of the push button through the heart-shaped cam by a resilient member, and a recess to the heart-shaped cam in a push-in position of the holder, thereby to maintain the push-in position of the holder against a biasing force of the resilient member.

10. A column mounted switching device for automobiles to work a turn-signal lamp and a hazard lamp, mounted on a steering column, comprising:
(a) a base plate mounted on the steering column;
(b) a turn-signal switch mounted on the base plate and provided with a first turn-signal contact, a turn-signal contact for right lamp, a turn-signal contact for left lamp and a turn-signal movable contact;
(c) a holder for the turn-signal switch causing the turn-signal movable contact to stand between the first turn-signal contact and the turn-signal contact for right lamp or between the first turn-signal contact and the turn-signal contact for left lamp so as to connect the first turn-signal contact to the turn-signal contact for right lamp or the turn-signal contact for left lamp according to an operation by an occupant;
(d) a hazard switch mounted on the base plate and provided with a first hazard contact, a hazard contact for right lamp, a hazard contact for left lamp and a hazard movable contact;
(e) a holder for the hazard switch causing the hazard movable contact to stand between the first hazard contact and the hazard contacts for right lamp and for left lamp, so as to connect the first hazard contact to the hazard contact for right lamp and the hazard contact for left lamp according to an operation by the occupant; and
(f) a common insulating plate provided together with the respective contacts of the turn-signal switch and the respective contacts of the hazard switch with the turn-signal switch contact portions and the hazard switch contact portions in the same plane, whereby the contacts are arranged close to each other on the insulating plate so as to simplify the structure.

11. A column mounted switching device for automobiles at set forth in claim 10, wherein a group of the turn-signal first contact and the hazard first contact, a group of the turn-signal contact for the right lamp and the hazard contact for the right lamp, and a group of the turn-signal contact for left lamp and the hazard contact for left lamp are respectively formed of contact pieces integrally connected to one another.

12. A column mounted switching device for automobiles as set forth in claim 11, wherein each of the contact pieces is provided on at least one end thereof with a male connecting terminal for connecting with such a power source as an automobile battery being formed integrally with each of the contact pieces.

13. A column mounted switching device for automobiles as set forth in claim 10, wherein a knob holder is pivotally supported on the base plate and the turn-signal movable contact is worked by the operation of a knob pivotally supported on the knob holder.

14. A column mounted switching device for automobiles as set forth in claim 13, wherein the operating direction of the turn-signal movable contact of the turn-signal switch worked by the nkob and that of the hazard movable contact of the hazard switch are substnatially of a right angle to one another whereby a configuration of the insulating plate provided with the contacts is formed substantially in an L shape.

15. A column mounted switching device for automobiles as set forth in claim 13, wherein a rotation of the knob in such a manner that the knob holder is not rotated works a dimmer and passing switch mounted on the base plate.

16. A column mounted switching device for automobiles as set forth in claim 10, wherein the hazard movable contact is moved and maintained into its push-in position through the holder for the hazard switch according to an operation by the occupant whereby the hazard switch is kept on.

* * * * *